United States Patent [19]
Cullen et al.

[11] Patent Number: 6,039,023
[45] Date of Patent: Mar. 21, 2000

[54] AIR CONTROL SYSTEM

[75] Inventors: Michael John Cullen, Northville, Mich.; John Phillip Tonkin, London, United Kingdom; Eric Blaine Ferch, Northville, Mich.

[73] Assignee: Ford Global Technologies, Inc., Dearborn, Mich.

[21] Appl. No.: 09/087,949

[22] Filed: Jun. 1, 1998

[51] Int. Cl.$^7$ .................................................. F02D 41/00
[52] U.S. Cl. ...................................... 123/339.23; 123/531
[58] Field of Search .............................. 123/339.23, 531, 123/339.19, 585

[56] References Cited

U.S. PATENT DOCUMENTS

| | | |
|---|---|---|
| 5,121,716 | 6/1992 | Takahashi et al. . |
| 5,148,788 | 9/1992 | Saikalis et al. . |
| 5,172,674 | 12/1992 | Horie ........................................ 123/308 |
| 5,211,148 | 5/1993 | Furuya et al. . |
| 5,220,899 | 6/1993 | Ikebe et al. . |
| 5,385,133 | 1/1995 | Ikuta et al. ............................... 123/585 |
| 5,406,919 | 4/1995 | Ikuta et al. .......................... 123/339.17 |
| 5,421,311 | 6/1995 | Wataya ..................................... 123/585 |
| 5,460,148 | 10/1995 | Suzumura et al. . |
| 5,492,094 | 2/1996 | Cullen et al. . |
| 5,509,397 | 4/1996 | Hoshi ....................................... 123/585 |
| 5,630,394 | 5/1997 | Grizzle et al. ...................... 123/339.23 |
| 5,730,110 | 3/1998 | Nelson et al. . |

*Primary Examiner*—Noah P. Kamen
*Assistant Examiner*—Hai Huynh
*Attorney, Agent, or Firm*—Jerome R. Drouillard

[57] ABSTRACT

An air control method for an internal combustion engine having air assist injectors and an electronically controlled throttle maximizes airflow through the injectors while maintaining a range of authority for the electronically controlled throttle. This method maximizes the benefits of fuel atomization while maintaining a desired engine speed in the presence of disturbances.

7 Claims, 6 Drawing Sheets

AIR CONTROL SYSTEM

FIELD OF THE INVENTION

The present invention relates to air control systems for internal combustion engines.

BACKGROUND OF THE INVENTION

Internal combustion engines use fuel injectors to precisely control the amount of fuel inducted into the engine's cylinders. Also, fuel injectors atomize the liquid fuel, increasing the homogeneity of the air and fuel mixture. Air assist injectors are devices that use airflow to enhance the atomization of fuel injected into an engine's cylinder. Air assist injectors may be required on some vehicles where additional fuel vaporization can promote better combustion and lower regulated emissions. Further, the air flowing through the air assist injector can be controlled to maximize the benefit as a function of engine operating conditions.

For example, at low engine operating temperature, fuel atomization can be enhanced by controlling a flow valve to be substantially open, thereby allowing a large airflow through the air assist injectors. On the other hand, air assist injector airflow can be restricted by controlling the flow valve to be substantially closed as the temperature increases to prevent overrunning of the engine. Another example, which can be combined with the previous example, is that the flow valve can be controlled to open proportionally to an engine load, thereby allowing an increasing airflow through the air assist injectors as engine load increases to counteract the decreasing pressure ratio caused by increasing manifold pressure. Such a system is disclosed in U.S. Pat. No. 5,460,148.

The inventor herein has recognized numerous disadvantages with the above approaches. For example, when the engine is operating at a mid-load condition, the airflow through the air assist injectors will not be maximized because the flow valve will be partially restricting the airflow to the air assist injectors. This is due to the valve being open proportionally to engine load. In other words, at mid-load, the valve is not fully open. Further, when the engine is started at a warm temperature, the flow valve will be restricting the airflow, thus preventing optimal atomization of the injected fuel, which can cause less than optimal emission control. Another disadvantage is related to the reliance on the operating temperature of the engine. For example, as an engine ages, less torque, and thus less air, may be required to maintain a given speed at a given temperature due to decreased friction. Thus, if temperature alone is used, the engine may develop an overrunning condition due to excess air flowing through the air assist injectors, which is utilized in combustion.

SUMMARY OF THE INVENTION

An object of the invention claimed herein is to provide an air control method for an internal combustion engine.

The above object is achieved, and disadvantages of prior approaches overcome, by providing an air control method for an internal combustion engine, the engine having a first airflow control valve and air assist injectors. The method comprises the steps of calculating a minimum total required airflow based on engine operating conditions, controlling the first airflow control valve to regulate a first quantity of airflow through the engine, and controlling a second quantity of airflow through the air assist injectors such that said first quantity of airflow is greater than a predetermined value with said predetermined value being defined as a difference between said total required airflow and said first quantity, thereby allowing said first airflow control valve to maintain primary control of the engine.

In the present invention, the first airflow control valve is responsible for the instantaneous control of the engine. The second airflow control valve is responsible for providing a gradual adjustment of the airflow through the air assist injectors. By controlling the second airflow control valve such that the first airflow control valve is never fully closed, it is always possible to reject disturbances. This is particularly true when the first airflow control valve has a faster response and higher accuracy than the second airflow control valve. Also, the this arrangement allows the second airflow control valve to maximize the air assist injector airflow while maintaining the first airflow control valve's ability to reject disturbances.

An advantage of the above aspect of the invention is that overrunning of the engine speed is avoided.

Another advantage of the above aspect of the invention is that the fuel atomization is maximized.

Yet another advantage of the above aspect of the invention is that regulated emissions are minimized.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
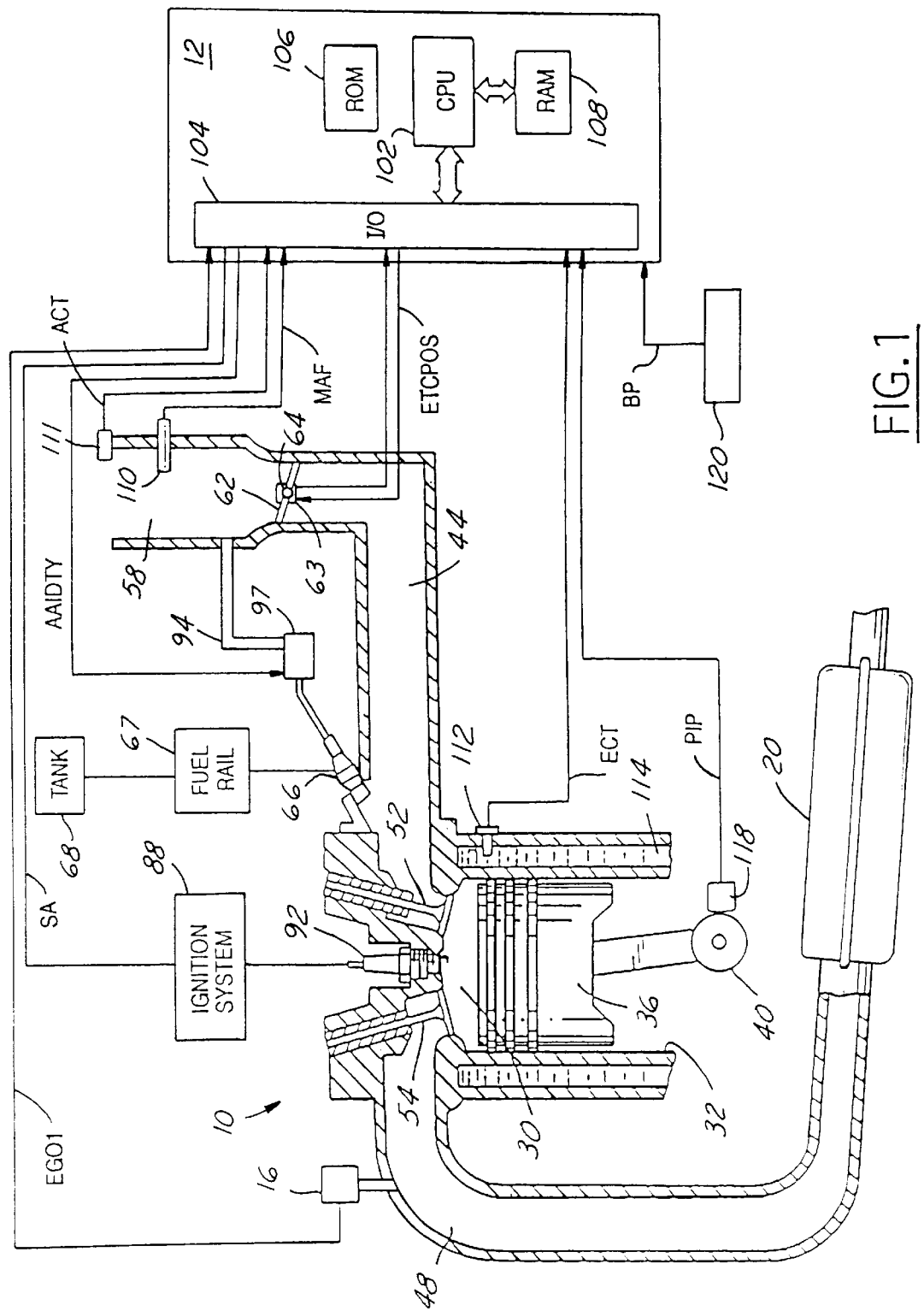
FIG. 1 is a block diagram of an engine incorporating air assist injectors according to the present invention.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Primary air control is governed by throttle plate 62. Throttle plate 62 is controlled by an electronic throttle controller 63. Throttle position of throttle plate 62 is measured by throttle position sensor 64. Controller 12 provides signal ETCPOS to electronic throttle controller 63 so that airflow is inducted into engine 10 around throttle plate 62 at a rate proportional to the signal ETCPOS. Intake manifold 44 is also shown having air assist injector 66 coupled thereto for delivering liquid fuel in proportion to the pulse width of signal fpw from controller 12. Fuel is delivered to fuel injector 66 by a conventional fuel system including fuel tank 67, fuel pump (not shown), and fuel rail 68.

Conventional distributorless ignition system 88 provides ignition spark to combustion chamber 30 via spark plug 92 in response to spark advance signal SA from controller 12.

Catalytic type exhaust gas oxygen sensor 16 is shown coupled to exhaust manifold 48 upstream of catalytic converter 20. Sensor 16 provides signal EGO to controller 12 which converts signal EGO into a two-state signal. A high voltage state of converted signal EGO indicates exhaust gases are rich of a desired air/fuel ratio and a low voltage state of converted signal EGO indicates exhaust gases are lean of the desired air/fuel ratio. Typically, the desired air/fuel ratio is selected as stoichiometry which falls within the peak efficiency window of catalytic converter 20.

Bypass passageway 94 is shown coupled between throttle body 58 and air assist injector 66 via solenoid bypass valve 97. Controller 12 provides pulse width modulated signal AAIDTY to solenoid bypass valve 97 so that airflow is inducted into engine 10 at a rate proportional to the duty cycle of signal AAIDTY.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: measurements of inducted mass air flow (MAR) from mass air flow sensor 110 coupled to throttle body 58; engine coolant temperature (ECT) from temperature sensor 112 coupled to cooling sleeve 114; intake air temperature (ACT) from temperature sensor 113 coupled to throttle body 58, a profile ignition pickup signal (PIP) from Hall effect sensor 118 coupled to crankshaft 40.

Figure 2A:
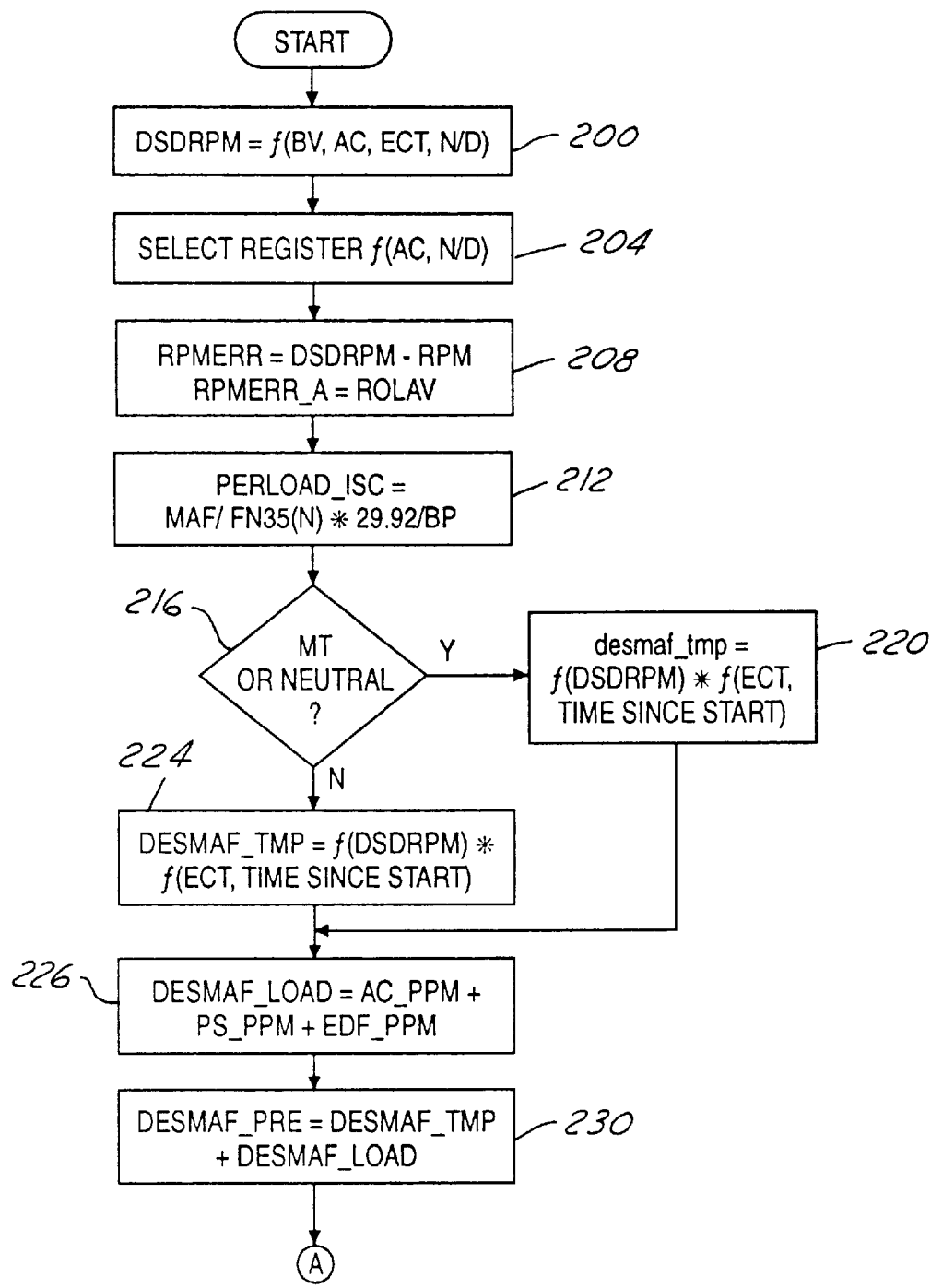
FIGS. 2–5 are flow charts of various operations performed by a portion of the embodiment shown in FIG. 1.
Figure 2B:
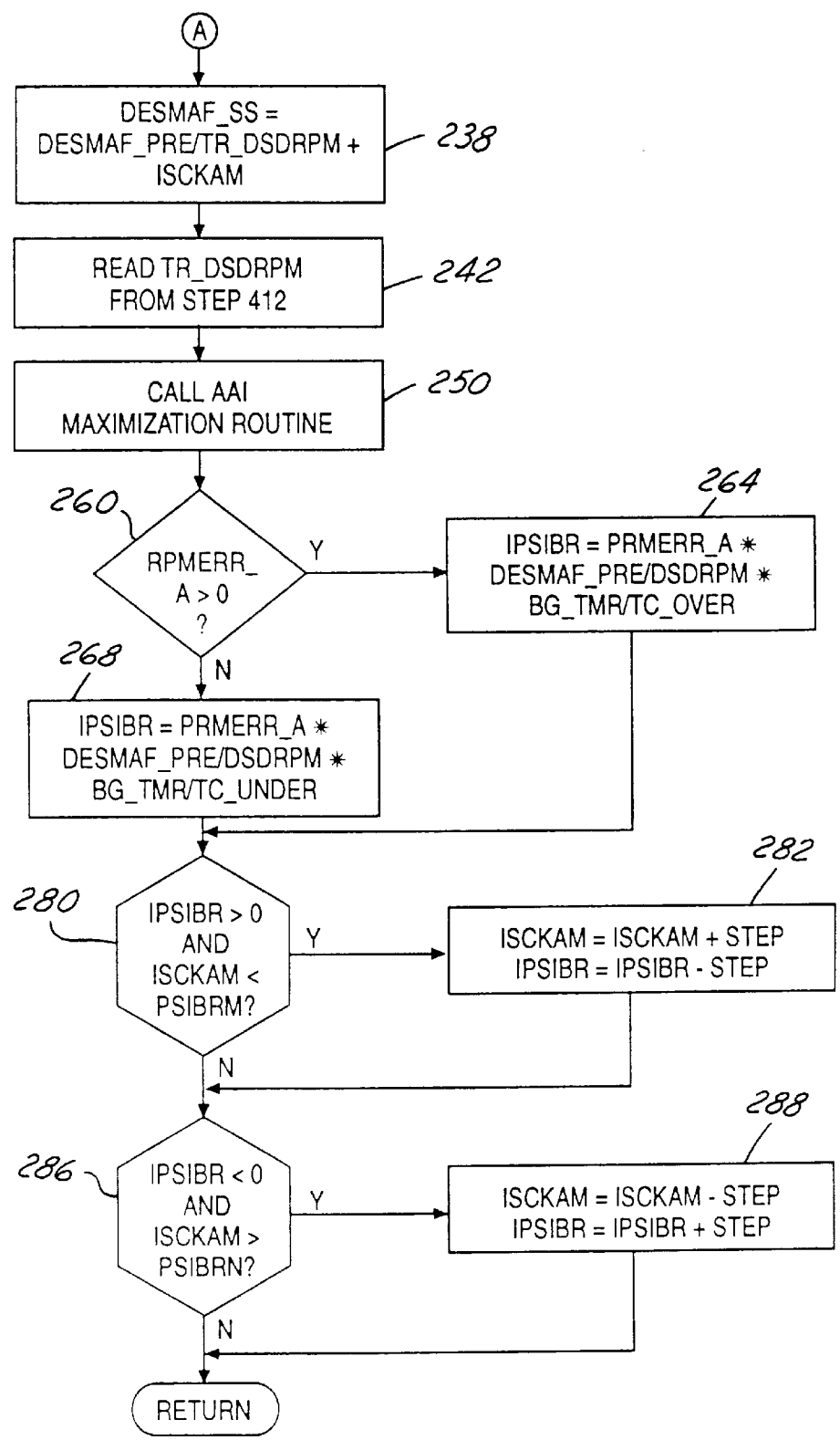
Figure 3:
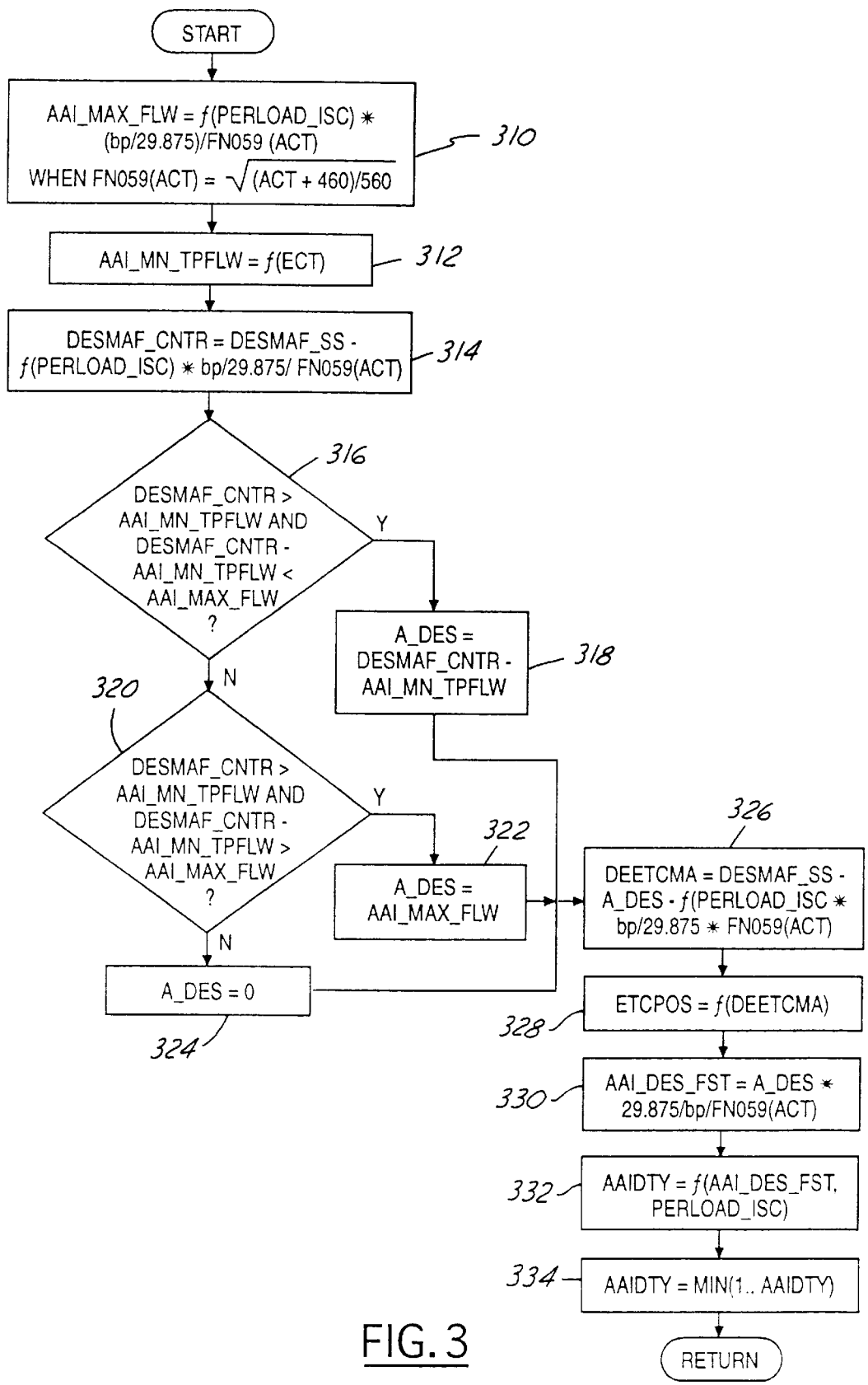
Figure 4:
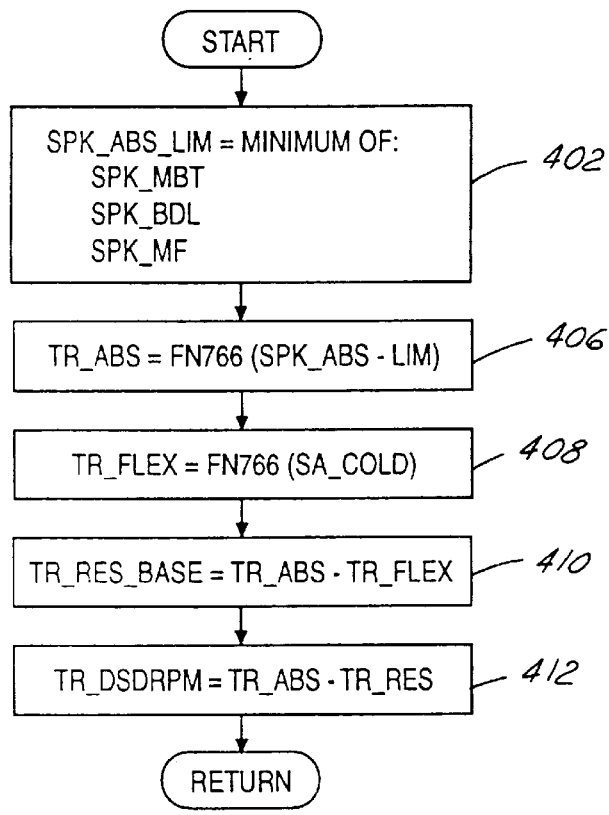

Referring now to FIGS. 2, 3, and 4, the subroutines executed by controller 12 for controlling engine idle speed are now described. Referring first to FIG. 2, desired idle speed signal DSDRPM is first calculated as a function of battery voltage BV, air conditioner enable signal AC, engine coolant temperature ECT and the neutral or drive transmission signal N/D (step 200). One of four storage registers is selected in step 204 as a function of signal AC, and signal N/D. More specifically, the following registers are selected: a first register is selected if the transmission is not in drive and the air conditioner is on; a second register is selected if the air conditioner is off and the transmission is in drive; a third register is selected if the transmission is in neutral and the air conditioner is on; and a fourth register is selected if the transmission is in neutral and the air conditioner is off.

Idle speed error signal RPMERR is calculated in step 208 by subtracting indication of engine speed signal rpm from desired idle speed signal DSDRPM. Signal RPMERR_A is also generated which is a rolling average of signal RPMERR with exponential smoothing. During step 212, an estimate of the pressure ratio across bypass valve 97 is provided. More specifically, signal PERLOAD_ISC is calculated by dividing a value (FN35) related to the peak air charge at wide open throttle into signal MAF. The resulting quotient is then multiplied by the ratio of 29.92 to barometric pressure BP.

If the vehicle has a manual transmission (MT) or an automatic transmission which is in neutral (step 216), desired air flow signal DESMAF_TMP is generated in step 220 as follows. A function of desired idle speed (DSDRPM) is multiplied times a function of engine coolant temperature (ECT). The resultant product is multiplied by time since engine start. On the other hand, if the answer to step 216 is negative, signal DESMAF_TMP is generated in step 224 as follows. A function of desired idle speed DSDRPM is multiplied by another function of engine coolant temperature (ECT) and the time since start.

Correction factor DESMAF_LOAD for desired mass air flow at various loads is generated during step 226. More specifically, signal DESMAF_LOAD is generated by summing signal AC_PPM when the air conditioner is on, signal PS_PPM when power steering is employed, and signal EDF_PPM when a cooling fan is activated (step 226). Open loop prediction of desired air flow (signal DESMAF_PRE) is generated during step 230 by adding previously calculated signal DESMAF_TMP and signal DESMAF_LOAD.

Open loop prediction of desired air flow (signal DESMAF_PRE) is corrected by signal TR_DSDRPM which is generated from the subroutine described later herein with particular reference to FIG. 4. In general, signal TR_DSDRPM provides a correction to the open loop desired air flow and corresponding open loop bypass throttle position of bypass valve 97. This correction preventing any initial drop in idle speed which would otherwise occur upon commencement of idle speed control under conditions when ignition timing is being retarded for rapid converter warm up.

Desired mass air flow DESMAF_SS is generated from a proportional plus integral plus derivative controller as now described with reference to steps 234–238 in FIG. 2. Proportional and derivative control gains are first generated. Proportional gain ISC_PROP is generated as a function of rpm and error signal RPMERR. Derivative term ISC_DER is generated as a function of the difference between rpm error signal RPMERR for the present and preceding background loops (step 234). Desired air flow signal DESMAF_PID from the proportional plus integral plus derivative controller (236) is generated by summing proportional term ISC_PROP with the sum of derivative term ISC_DER, integral error term IPSIBR, and adding adapted integral term ISCKAM (step 236). Total desired air flow DESMAF_SS is then generated by adding proportional plus integral plus derivative output signal DESMAF_PID to the ratio of signal DESMAF_PRE to signal TR_DSDRPM (step 238). After TR_DSDRPM is read from the routine described later herein with particular reference to FIG. 4 (step 242), the air assist injector maximization routine is called (step 250), which calculates the signals ETCPOS and AAIDTY as described later herein with particular reference to FIG. 3.

If the rolling average of the engine speed error signal (RPMERR A) is positive (step 260), then integral error term IPSIBR is generated as shown in the following equation:

IPSIBR=RPMERR_A * DESMAF_PRE/DSDRPM * BG_TMR/TC_OVER where: BG_TMR is the background loop time; and TC_OVER is a calibratable time constant for overspeed.

On the other hand, when signal RPMERR_A is negative, the integral error term is calculated by the following equation:

IPSIBR=RPMERR_A * DESMAF_PRE/DSDRPM * BG_TMR/TC_UNDER where: TC_UNDER is a calibratable time constant for underspeed.

When integration term IPSIBR is positive and adaptive air flow corrections ISCKAM are less than minimum clip value PSIBRN (step 280), air flow corrections ISCKAM and integral term IPSIBR are generated by the equations shown in Step 282 as follows:

ISCKAM=ISCKAM (previous)+STEP

IPSIBR=IPSIBR (previous)−STEP where: STEP is a calibratable step size.

When integral term IPSIBR is negative and air flow correction term ISCKAM is greater than minimum clip PSIBRN (step 286), air flow correction terms ISCKAM and integral term IPSIBR are generated by the equations shown in Step 288 as follows:

ISCKAM=ISCKAM (previous)−STEP

IPSIBR=IPSIBR (previous)+STEP

Referring now to FIG. 3, according to the present invention, a subroutine for controlling the distribution of air controlled by throttle plate 62 and bypass valve 97 is now described. Maximum airflow possible through the air assist flowpath (AAI_MAX_FLW) is calculated from a function of PERLOAD_ISC, barometric pressure BP, and ACT (step 310). Next, the minimum desired throttle mass flow to maintain an idle speed control range of authority (AAI_MN_TPFLW) for electronic throttle controller 63 is calculated as a function engine coolant temperature (ECT) (step 312). The range of authority represents the amount of airflow necessary for the idle speed control system to reject disturbances. For example, it is undesirable for throttle plate 62 to be completely closed and all of the air necessary to create the desired torque being supplied through the air assist injectors. It is undesirable because if a load is suddenly removed, such as for example the air conditioning compressor, the engine will experience a rise in engine speed because bypass valve 97 cannot react quick enough. In step 314, the desired airflow around throttle plate 62 and air assist injector 66 (DESMAF_CNTR) is calculated by the equation shown in step 314 as follows:

DESMAF_CNTR=DESMAF_SS − FN818(PERLOAD_ISC)
*BP/29.875*FN059(ACT)

where: FN818(PERLOAD_ISC) is a function of PERLOAD_ISC and represents flow leaking into the manifold; and FN059(ACT)=square root ((ACT+460)/560).

When, DESMAF_CNTR is greater than AAI_MN_TPFLW and DESMAF_CNTR-AAI_MN_TPFLW is less than AAI_MAX_FLW, the desired air assist airflow (A_DES) is set to DESMAF_CNTR-AAI_MN_TPFLW (steps 316 and 318). Otherwise, when DESMAF_CNTR is greater than AAI_MN_TPFLW and DESMAF_CNTR-AAI_MN_TPFLW is greater than AAI_MAX_FLW, the desired air assist airflow (A_DES) is set to AAI_MAX_FLW (steps 320 and 322). Otherwise, desired air assist airflow (A_DES) is set to zero (step 324).

Continuing with FIG. 3, in step 326, the routine calculates the amount of air desired around throttle plate 62 as follows:

DEETCMA=DESMAF_SS − A_DES − FN818(PERLOAD_ISC)
*BP/29.875*H(ACT)

where: FN818(PERLOAD_ISC) is a function of PERLOAD_ISC and represents flow leaking into the manifold and H(ACT)= FN059(ACT).

Next, in step 328, a desired throttle position (ETCPOS) is calculated as a function of the amount of air desired around throttle plate 62 (DEETCMA). The routine then calculates the desired air assist injector airflow equivalent at standard temperature and pressure (AAI_DES_FST) as shown in step 328. Next, this value is converted to a duty cycle (AAIDTY) in step 332 as a function of the bypass valve versus duty cycle and pressure ratio. More specifically, signal AAIDTY is generated as a function of signals AAI_DES_FST and signal PERLOAD_ISC. Signal PERLOAD_ISC was generated as previously described with reference to step 212. Finally, in step 334, AAIDTY is clipped to a maximum value of one because it is improper to request a duty cycle greater than one hundred percent.

Referring now to FIG. 4, the subroutine for generating correction signal TR_DSDRPM to correct open loop desired air flow signal DESMAF_PRE and the corresponding initial throttle position of bypass throttle valve 96 is now described. An absolute limit of ignition timing (signal SPK_ABS LIM) is first selected in step 402 as the minimum of: ignition timing at maximum engine torque MBT (signal SPK_MBT), ignition timing associated with borderline knock (signal SPK_BDL); and ignition timing associated with engine misfire (signal SPK_MF).

The above generated spark absolute limit (SPK_ABS_LIM) is then converted to torque ratio TR_ABS by conversion function FN766 during step 406. In this particular example, conversion function FN766 is a table of engine output torque as a function of ignition timing.

Ignition signal SA_COLD, which is the ignition timing retard during engine startup, is converted in step 408 to torque ratio TR_FLEX by function FN766. Torque ratio TR_FLEX is the flexible torque ratio limit which may be exceeded if required to maintain engine idle speed. Reserved torque ratio TR_RES_BASE, which could correspond to a reserve in ignition timing to maintain a desired range of authority for engine idle speed control via ignition timing, is then generated in step 410 by taking the difference between torque ratio TR_ABS and torque ratio TR_FELX.

During step 412, the correction value associated with the torque ratio at desired engine speed (TR_DSDRPM) is generated by taking the difference between absolute torque ratio TR_ABS and reserve torque ratio TR_RES.

Figure 5:
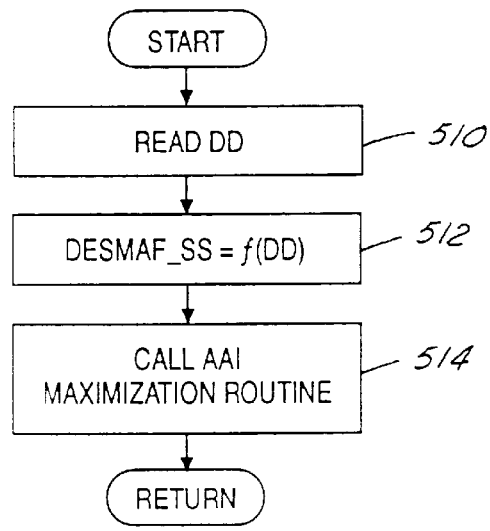

Referring now to FIG. 5, the subroutine executed by controller 12 for controlling total engine airflow during non-idle conditions are now described. During step 510, a driver demand signal (DD) is obtained from, for example, a position sensor measuring a driver pedal mounted in the engine compartment. As would be obvious to one of ordinary skill in the art and in view of this disclosure, many other methods may be used to infer a driver demand signal. In step 512, desired mass air flow (DESMAF_SS) is calculated as a function of the driver demand signal (DD). As is obvious to one of ordinary skill in the art, DESMAF_SS may also be a function of many other signals, such as engine speed, engine torque, desired engine torque, and vehicle speed. Finally, in step 514, the air assist injector maximization routine is called to distribute the required airflow between electronic throttle controller 63 and bypass valve 97.

As previously described herein, the air assist maximization routine will maintain the air flowing through air assist injectors at a maximum value while still maintaining a necessary range of authority of the electronic throttle controller to reject disturbances and maintain the desired idle speed or engine torque. By doing this, optimum fuel atomization may be obtained resulting in minimal emissions and reduced engine speed fluctuations.

Figure 6:
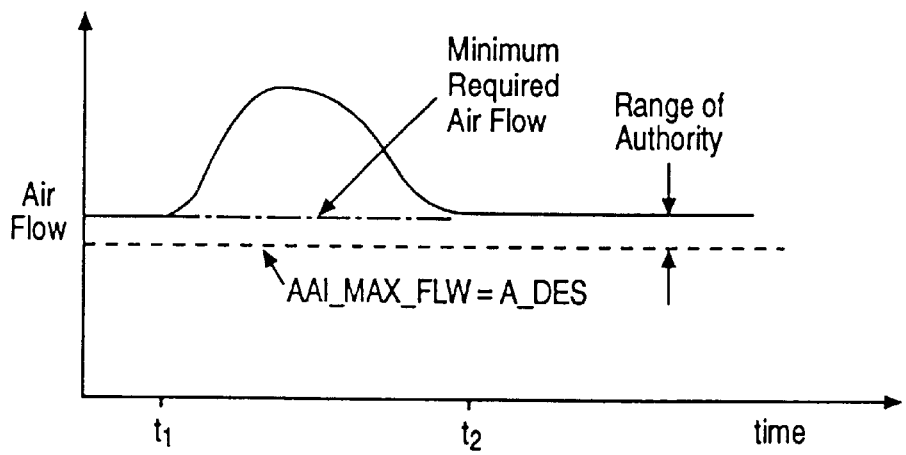
FIGS. 6–7 are examples of operation according to the present invention.
Figure 7:
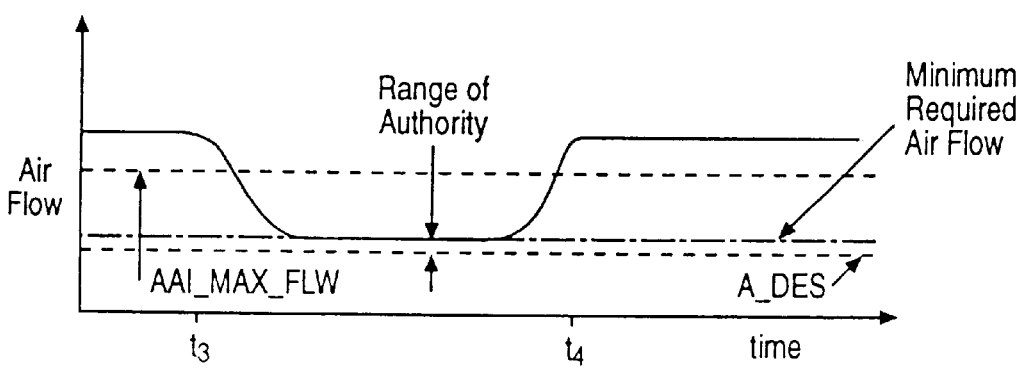

Referring now to FIGS. 6 and 7, and in particular to FIG. 6, a plot of an example of operation according to the present invention shows the total desired airflow through the engine to maintain a constant engine speed during idle conditions (solid line). A dotted line of this example shows the maximum possible airflow through the air assist injectors (AAI_MAX_FLW), which in this example is equal to the desired airflow through the air assist injectors (A_DES). At time t1, an accessory load for example is applied to the engine, which causes the engine to require more airflow. At time t2, the accessory load is removed. In this example, the engine operating condition, such as, for example, engine coolant temperature, is used to determine that the minimum required airflow, shown by the dash-dot line, will never be below the maximum possible airflow through the air assist injectors (AAI_MAX_FLW). In other words, when this minimum required airflow is greater than or equal to the maximum possible airflow through the air assist injectors (AAI_MAX_FLW), the airflow through the air assist injects can be set at the maximum value. Thus, in this example, the desired airflow through the air assist injectors (A_DES) is set to this maximum value and throttle controller 63 will have a range of authority greater than the difference between the total desired airflow and the desired airflow through the air assist injectors as shown in FIG. 6.

Continuing with FIG. 7, which shows an example of a situation where the maximum possible airflow through the air assist injectors (AAI_MAX_FLW) is greater than the minimum required airflow for this operating condition. In this example, at time t3 an engine accessory load is removed and then reapplied at time t4. Thus, in this example, the desired airflow through the air assist injectors (A_DES) must be set lower than this minimum required airflow as shown in FIG. 7. By doing this, a situation where the total required airflow drops below the airflow through the air assist injectors is avoided. This further avoids a situation where throttle controller 63 must completely close throttle plate 62 and rely on bypass valve 97 to maintain engine idle speed by reducing flow through the air assist injectors.

The two examples in FIGS. 6 and 7 show that, by using a priori knowledge of the minimum required airflow versus engine operating conditions, it is possible to control the air through the air assist injectors such that throttle plate 62 will never be more closed that a predetermined value. This allow throttle plate 62 to maintain primary control at all times throughout all operating conditions.

While the best mode for carrying out the invention has been described in detail, those skilled in the art in which this invention relates will recognize various alternative designs and embodiments, including those mentioned above, in practicing the invention that has been defined by the following claims.

What is claimed is:

1. An air control method for an internal combustion engine having a combined airflow into the engine including a first airflow into the engine via a first airflow control valve and a second airflow into the engine via a second airflow control valve and an air assist injector, the method comprising:

generating a predetermined airflow threshold;

adjusting the first control valve to control the combined airflow to a desired combined airflow; and adjusting the second control valve to control the second airflow to be less than said predetermined airflow threshold to prevent the first control valve from closing less than a preselected amount.

2. The method recited in claim 1 wherein said predetermined threshold is based on an engine operating condition.

3. The method recited in claim 2 wherein said engine operating condition is an engine operating temperature.

4. The method recited in claim 1 wherein said desired total airflow is based on a desired engine torque.

5. The method recited in claim 1 wherein said predetermined threshold is a minimum total required airflow.

6. The method recited in claim 5 wherein said adjusting the second control valve further comprises adjusting the second control valve to control the second airflow to be a maximum airflow through the second control valve when said minimum total required airflow is greater than a sum of said maximum airflow and a range of authority.

7. The method recited in claim 1 wherein said desired combined airflow is based on an engine speed error during engine idle speed control.

* * * * *